United States Patent
Aries

[11] 3,891,759
[45] June 24, 1975

[54] STABILIZED SLOW RELEASE DDVP COMPOSITION

[76] Inventor: Robert Aries, 69 Rue de la Faisanderie, Paris, 16ᵉ France

[22] Filed: July 27, 1973

[21] Appl. No.: 383,095

Related U.S. Application Data

[63] Continuation of Ser. No. 45,600, June 11, 1970, abandoned.

[52] U.S. Cl. .................... 424/219; 424/19; 424/27
[51] Int. Cl. .......................................... A01n 9/36
[58] Field of Search ................. 424/219, 26, 27, 19

[56] References Cited
UNITED STATES PATENTS
3,485,868   12/1969   Eddy et al. ........................... 260/488
FOREIGN PATENTS OR APPLICATIONS
903,159   8/1962   United Kingdom
OTHER PUBLICATIONS
Chemical Abstracts, Vol. 8, (1963), p. 11912a.
Chemical Abstracts, Vol. 60, (1964) p. 7384c.

*Primary Examiner*—V. D. Turner
*Attorney, Agent, or Firm*—Johnston, Keil, Thompson & Shurtleff

[57] ABSTRACT

New and valuable pesticides in which the active ingredient is an organophosphorus compound having the formula

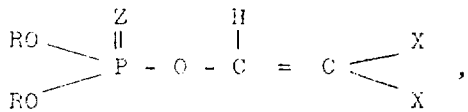

where R denotes an organic radical having at most 4 carbon atoms, Z denotes sulfur or oxygen and X denotes a halogen atom, preferably chlorine or bromine, and especially dimethyl dichlorovinyl phosphate (DDVP; generic name: dichlorvos) having the formula

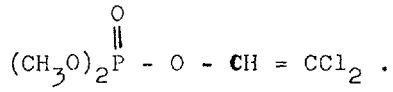

The pesticides are valuable agents for controlling insects and animal parasites, especially helminths.

1 Claim, No Drawings

STABILIZED SLOW RELEASE DDVP COMPOSITION

This application is a continuation of application Ser. No. 45,600, filed June 11, 1970, now abandoned.

The present invention relates to new pesticides and their use. The active ingredient in these agents is an organophosphorus compound having the general formula

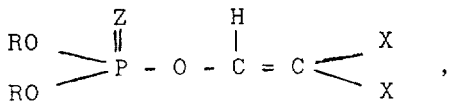

where R denotes methyl, ethyl, propyl or butyl, Z denotes sulfur or oxygen, and X denotes halogen, preferably chlorine or bromine, and especially dimethyl dichlorovinyl phosphate (DDVP; generic name: dichlorvos) having the formula

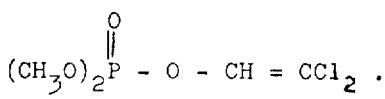

The pesticides according to the invention are mainly used on insects and animal parasites, especially helminths.

It is known to use organophosphorus compounds, especially DDVP, as pesticides; however, the volatility of this group of compounds severely restricts their effectiveness. DDVP thus volatilizes in an uncontrollable manner from the carrier into which it is usually incorporated; this volatilization is very rapid at the beginning and ceases after a relatively short period of time.

Numerous methods have been proposed for regulating the release of the active ingredients, in particular one in which an inert absorbing material is impregnated with the active ingredient. It has, however, been found in practise that the amount evaporated during use is not constant, and decreases considerably as a function of time. Regular release is, however, most important as the effectiveness of the product and its non-toxicity for humans depends on a certain concentration, i.e. a closely limited concentration in the air, being maintained. For controlling pests such as flies, moths or gnats with DDVP vapor, e.g. in the home, the content of this insecticide in the air should be of the order of 0.05 mg/m$^3$. Furthermore, the "American Conference of Governmental Industrial Hygienists" determined in 1965 that a concentration of 1 mg/m$^3$ of air is injurious to warm bloods. The rate of evaporation must therefore be kept constant when using an evaporator or diffuser. To obtain a concentration of 0.05 mg/m$^3$ of DDVP in places of habitation whose air is replenished several times a day, the evaporator or diffuser must release 0.1 mg of DDVP per hour and m$^3$ of space. For a room of 40 m$^3$, 96 mg per day must be evaporated. A known system containing about 20 g of DDVP fixed with a plasticizing composition releases on average 220 mg of DDVP per day at 20°C in the first month, 140 mg in the second and 70 mg per day in the third month. The main cause of this continuous decrease is the surface tension which keeps the liquid in the carrier; the less solution in the carrier, the more pronounced this effect is.

In addition to the unsatisfactory evaporation of DDVP, a considerable proportion thereof remains in the carrier and does not evaporate strongly enough to be effective; the product may then constitute a danger as a result of its toxicity in garbage.

In short, DDVP in the known agents, particularly where DDVP is incorporated into a plastics material with the aid of a plasticizer, is released in an uncontrollable and unsatisfactory manner.

An object of the invention is to overcome the said disadvantages with new agents which enable a controlled, essentially constant release of the evaporating active ingredient to the air at a rate which can be previously determined. The active ingredient, i.e. the organophosphorus compound having the above formula, particularly DDVP, in the agents according to the invention is released over the required period without toxic residues remaining after evaporation in those cases in which the active ingredient is incorporated into a carrier or the carrier is impregnated with the active ingredient. According to the invention, all the pesticide is used in a controlled manner, whereas 35 to 70% of the effectiveness of the known product may remain unused in the carrier.

It has now been found that, surprisingly, the above requirements can be met with pesticides based on organophosphorus compounds having the above formula containing one or more than one organic compound having a low molecular weight, preferably less than 1,000, which is miscible in all proportions at the utilization temperature with active organophosphorus compounds, is chemically inert to the said active ingredient, and has a higher vapor pressure than the active ingredient, particularly a vapor pressure at 20°C of above 0.012 mm Hg in the case of DDVP.

The results which are achieved by the addition of low molecular weight compounds to pesticides based on organophosphorus compounds are all the more surprising as it was previously thought that compounds having a higher molecular weight would have to be used to incorporate substances such as DDVP more easily into carriers.

Without restricting the invention to a particular theory, it may be assumed that the low molecular weight organic compounds of the invention act as coevaporating agents which diffuse into the atmosphere together with the active ingredient and have, upon the evaporation of the latter, a regulating action. In the following part of the disclosure the above low molecular weight compounds will be referred to as coevaporating substances.

The coevaporating substances reduce the vapor pressure of the active ingredient, which results in a lower active ingredient concentration in the air. It has been found that this reduction is all the more in evidence, the lower the molar concentration of the compound in question in the mixture is.

The active ingredient is therefore released less quickly than the other solvents; this results in a continuous rise in its molar proportion in the remaining mixture and in its vapor pressure in the air, the degree of evaporation increasing as a function of time. It is possible in this way to slow the reduction in evaporation caused by surface tension and thus to control the daily release over a long period of time. Too high concentrations at the beginning, and insufficient concentrations towards the end of use can therefore be avoided.

The choice of coevaporating substance is dictated by the fact that it should not be used in major amounts. Its molecular weight should therefore be as low as possible. It has, however, been ascertained in accordance with the invention that the volatility of the coevaporating substance should not be too high, something which normally entails a fairly high molecular weight. In short, it has been found that those coevaporating substances are suitable whose molecular weight is of the same order of magnitude as that of the active ingredient; the molecular weight of the coevaporating substance should, however, not exceed approximately 1,000. The choice of a coevaporating substance may be based on the molecular weight of the active ingredient, which in the case of DDVP is 221.

Another feature of the agents of the invention is that the coevaporating substances are selected from low molecular weight esters. In this case, the molecular weight should not exceed 250, and is preferably between 120 and 250. The coevaporating ester may be a monoester, diester or triester having preferably from 8 to 15 carbon atoms. The coevaporating esters are preferably derived in the case of DDVP from an acid whose molecular weight does not exceed 220 and from an alcohol whose molecular weight is less than 223, the molecular weight of the ester generally being within the range of that of the active ingredient.

According to a further feature of the invention, the pesticides contain not only the principle coevaporating substance but also additives which have to meet certain requirements. These additives according to the invention should be selected in such a way that they contribute towards regulating the release of the active ingredient, that they inhibit hydrolysis of the active ingredient and any polymerization which may occur in the mixtures, and that they neutralize acids present in the mixtures.

The additives according to the invention are stabilizers and water-repellents.

It is also possible to incorporate further additives into the mixtures according to the invention to give suitable products for use in pest control. The mixture may, for example, contain perfumes. A special feature of the invention is that the perfume may be the coevaporating substance itself, especially an ester.

In accordance with yet another feature of the invention, the mixture according to the invention contain volatile solvents, especially for applying the mixtures to a carrier.

The additives must, as described above, when used per se or in admixture (especially with the coevaporating substance), fulfill certain conditions.

It has been found that, as is the case with the coevaporating substance, the vapor pressure of the additives should be less than that of the active ingredient.

The addition of the volatile active ingredient to the mixture of coevaporating substance and additives reduces its vapor pressure upon commencement of use and then progressively increases it. For this reason, mixture of coevaporating substance and additives are chosen according to the invention whose vapor pressure is higher than that of the active ingredient.

The additives, like the coevaporating substance, must be miscible in all proportions at the utilization temperature with the active ingredient, and be chemically inert to each other, to the active ingredient and to the carrier, i.e. they should not form any new compounds or irreversible molecular groupings.

The mixture of volatile additives and coevaporating substances should have a vapor pressure such that the ratio of it to that of the active ingredient is from 1.1:1 to 20:1. Furthermore, their boiling temperature at 1 mm Hg should be between 50° and 85°C, preferably between 60° and 80°C, in order to regulate better the release of the active ingredient.

The chemical functions and the uses of the coevaporating substances and additives according to the invention are not connected with the reasons for which they were chosen according to the invention. It is therefore possible when selecting, according to the invention, the molecular weight and the number of constituents in addition to the active ingredient to vary within wide limits the molar concentration of the active ingredient.

The active ingredient may be any compound having the above formula; in addition to DDVP, the following compounds may be given as examples (the list should not, however, be taken to be exhaustive):

2,2-dichlorovinyl diethyl phosphate;
2,2-dichlorovinyl dipropyl phosphate;
2,2-dichlorovinyl dibutyl phosphate;
2,2-dibromovinyl dimethyl phosphate;
2,2-dibromovinyl dipropyl phosphate;
2-bromo-2-chlorovinyl dimethyl phosphate;
2-bromo-2-chlorovinyl diethyl phosphate;
2-bromo-2-chlorovinyl methylethyl phosphate;
and the corresponding thiophosphates.

It is also possible with the mixtures according to the invention to add other known pesticides to the organophosphorus compound, e.g. pyrethrin, chlorinated hydrocarbons, chlorinated terpenes, and even deodorants which act in the same manner, especially by evaporation.

All the volatile substances according to the invention may be absorbed by porous materials which are inert to them, or incorporated as a new additive into known carriers, particularly small sheets made of a plastics material compatible with DDVP, e.g. polyvinyl chloride.

With regard to the carrier, the mixtures according to the invention may be plasticizers or impregnating solutions. In the former case, they should be mixed with the sheet before its assembly or extrusion, and in the second case, a third extremely volatile solvent may be used to facilitate the impregnation of the sheet; this third solvent should, as stated above be chemically inert to DDVP, the coevaporating solvents and the carrier, and should, if necessary, be able to be removed easily by drying in a drying cabinet. A very large number of chemical products meet all these conditions.

Without wishing to give an exhaustive list of all the possible compounds, the following may be mentioned: organic esters complying with the above molecular weight conditions; amines; amides; saturated, unsaturated and cyclic carbides; nitriles; aldehydes; and ketones.

It has been suggested that primary, preferably secondary or tertiary, alcohols be used as solvents for the active ingredient, but because they are very hygroscopic, moisture is retained and concentrated in the solution which decomposes the phosphoric esters very rapidly into compounds which have no action whatsoever for pest control purposes. It has also been suggested that certain alcohols be used as active ingredients in the pesticides based in dimethyl trichlorovinyl phosphate (dichlorvos or DDVP) on polyvinyl chloride carriers. It has, however, been found that all alcohols contribute towards the decomposition of the active ingredient, but that they are still used with the addition of larger amounts of stabilizers. These stabilizers, which reduce the decomposition of the active ingredient make the mixture more expensive and also have the disadvantage that they promote the decomposition of an amount of active ingredient equivalent to their own, and in many cases of a considerably larger amount. For this reason, no alcohols or other compounds having a hydroxyl group are used in the agents according to the invention, and when using esters as coevaporating substances the remaining proportion of alcohol in the mixture is neutralized by stabilizers.

In the pesticides according to the invention, stabilizers for phosphoric esters are used — epoxidized stabilizers, azo compounds — but always in the presence of metal salts of fatty acids which increase their action but diminish their concentration which is more dangerous than effective. The stabilizers must be miscible in all ratios with DDVP and the evaporating substances at the utilization temperature; they must also be chemically inert to them and not as volatile so that they are present for the whole period of use. For this purpose, their vapor pressure should be low than that of the active ingredient (in the case of DDVP, 0.012 mm Hg at 20°C). These stabilizers prevent hydrolysis and decomposition of DDVP; they should never be used in the presence of an alcohol group which has voluntarily introduced into the compound for any reason whatsoever. Furthermore, the epoxy compounds used are not chlorinated. The final condition is that the hygroscopicity of the stabilizers and coevaporating substances should be as low as possible, as they would otherwise promote hydrolysis of the active ingredient.

The carriers for coevaporating substance, stabilizers and DDVP may be of various types-kneadable or absorbing. If they are of plastic, as is the case with the known sheets, the solution according to the invention must be an additional plasticizer which is added to the other known plasticizers; with esters, it must consist of compounds having a molecular weight of less than 250 but under no circumstances higher than 1,000. The absorbing carriers may be of an organic or inorganic nature, e.g. cellulose fibers, per se or mixed with natural or synthetic fiber products; asbestos; wool; cloth; knitted fabrics; glass fibers; silicon fibers; gypsum; felt; natural sponge; mattwhite porcelain; clay; porous or expanded polymers, on condition that all these compounds are inert to the solution. The liquid mixtures of DDVP with one or several of the coevaporating substances according to the invention are introduced together with the polyvinyl chloride compound into a mixer, and the whole is mixed at a temperature of from 50° to 100°C. It is possible to add known plasticizers or a known diluent for PVC, as well as stabilizers for DDVP. The percentage of PVC generally lies between 40 and 70%, that of DDVP between 10 and 20%, that of the solvents according to the invention between 5 and 25% and that of known plasticizers between 10 and 30%. The absorbing sheets may be used singly or together with others, either arranged at a distance from each other or laid on top of each other. When impregnated carriers are used, it is possible, if the percentage of DDVP is governed by law in various countries, to pretreat the cellulose or to use heavy carriers, generally inorganic substances. It has been found that a higher degree of efficiency is obtained with these absorbing carriers which have been previously heated in a drying cabinet to dry them and then treated with organosilicon compounds so that they absorb no water vapor.

To improve the control of the release of the active ingredients and coevaporating substances it is possible to wrap a sheet or a carrier treated with a mixture according to the invention in a protective film provided with holes, or to place the treated carrier in a perforated housing, the holes of the housing forming between about 10 and about 90% of the whole surface of the object. The film and housing must be made of a chemical substance which is chemically inert to the active ingredient and to the other components of the mixture. The film is usually made from a plastics material.

In certain cases the sheets are laid on top of each other in such a manner that the sheet in the middle acts as an active ingredient reservoir due to its absorption capacity which is greater than that of the others.

It is also possible, as is mentioned above, to add perfumes to the sheets; these perfumes may be coevaporating substances and meet the conditions placed on them, e.g. citral, linalyl butyrate (lavender odor).

It is of course possible to use the compounds according to the invention without carriers, and to this end the liquid mixtures are converted to an atomized or gaseous form.

According to a particular embodiment of the compounds according to the invention, they may be applied to a carrier and incorporated in this form into a collar with the aid of which animals, especially dogs, can be protected against insects.

Just like the abovementioned housing, the collar is preferably provided with holes by means of which the evaporation of the active ingredient can be satisfactorily regulated.

In the following examples, which should not be regarded as exhaustive, but which illustrate the present invention, cellulose sheets measuring 20 × 11 × 0.6 cm and placed on top of each other are impregnated with the compositions according to the invention. Two separate experiments are carried out for each example. In the first series of experiments, the impregnated sheets are left in their packings and kept at 25°C for 60 days; in the course of these 60 days, they are heated each week for 5 minutes at 50°C and kept at 25°C for the rest of the time. The results of this series of experiments are given in Table I. For measuring the amount of DDVP, a new, specially developed titrimetric method is used which is based on the fact that, as a result of the hydrolysis of DDVP, an acid is formed which can be exactly titrated using one-tenth N caustic soda solution. In the second series of experiments, the impregnated sheets are placed in a room with a volume of about 40 m³ and having a temperature of 20°C ± 2°C, which is kept constant; the air is replenished several times each day just as in a room which is inhabited by humans. The release of DDVP determined by gas chromatography, and the results obtained are given in Table II.

In the examples, all percentages are by weight and the technical purity of the DDVP is 97%. The sheets are impregnated to saturation.

Other features of the invention will be evident to the skilled worker from the following examples.

It is not intended that the examples illustrating the present invention should limit it in its scope or concept. Comparative examples are also included in the following.

The following compositions are prepared and small sheets impregnated with them.

EXAMPLE 1
| | |
|---|---|
| DDVP | 110% |

EXAMPLE 2
| | |
|---|---|
| DDVP | 45% |
| isobutyl benzoate | 25% |
| benzyl propionate | 25% |
| isoamyl benzoate | 5% |

EXAMPLE 3
| | |
|---|---|
| DDVP | 50% |
| n-octanol | 30% |
| sec-octanol | 20% |

EXAMPLE 4
| | | |
|---|---|---|
| DDVP | 50% | |
| dibutyl maleate | 25% | |
| dimethyl formamide | 20% | |
| styrene oxide | 3% | (epoxy compound) |
| ethyl phenylglycidate | 2% | |

EXAMPLE 5
| | | |
|---|---|---|
| DDVP | 50% | |
| methyl caprylate | 20.5% | |
| isoamyl benzoate | 20% | |
| diphenyl ether | 9% | |
| chrysoidine | 0.5% | (azo compound) |

EXAMPLE 6
| | |
|---|---|
| DDVP | 50% |
| diethyl maleate | 20% |
| dibutyl fumarate | 10% |
| ethyl toluate | 15% |
| tribasic aluminum stearate | 3% |
| dibasic magnesium stearate | 2% |

EXAMPLE 7
| | |
|---|---|
| DDVP | 50% |
| methyl caprate | 15% |
| propyl benzoate | 15% |
| benzyl acetate | 15% |
| expoxidized poppy oil | 3% |
| tribasic aluminum stearate | 2% |

EXAMPLE 8
| | | |
|---|---|---|
| DDVP | 50% | |
| benzyl isobutyrate | 25% | |
| ethyl benzoate | 15% | |
| isoamyl isobutyrate | 6% | (more volatile than the other compounds) |
| epoxidized soybean oil | 2% | |
| calcium stearate | 2% | |

The following compounds may also be used:

| | |
|---|---|
| ethyl acetoacetate | tert-butyl acetate |
| hexyl acrylate | isobutyl isobutyrate |
| 3-ethoxypropyl acrylate | butanediol diacrylate |
| 2-ethylhexyl acetate | dimethyl succinate |
| allyl acetoacetate | dibutyl succinate |
| diethylene glycol monoethyl ether acetate | dimethyl glutarate |
| isopropyl benzoate | dibutyl glutarate |
| hexene carboxylate | dimethyl adipate |
| 2-ethylbutyl-2-ethylbutyrate | dimethyl maleate |
| diisopropyl maleate | n-butyl carbamate | and the esters of the following alcohols having a molecular weight of less than 250:

2-methylhexanol-5 (b.p. 153°C);
tridecanol (b.p. 25°C);
pentanediol-1,5 (b.p. 244°C);
2-ethylhexanediol-1,3 (b.p. 146°C at 24 mm Hg);
2,2-dimethylhexanediol-1,3 (b.p. 233°C);
1-norbonyl-2-ethanol-1;
4-terbutyl cyclohexanol (b.p. 115°C at 20 mm Hg).

EXAMPLE 9

Action on Houseflies (*Musca Domestica*)

The following solution is prepared which is designated solution A in all examples:

| | |
|---|---|
| DDVP | 45% |
| isobutyl benzoate | 20% |
| dibutyl maleate | 10% |
| ethyl maleate | 10% |
| dibutyl fumarate | 5% |
| isoamyl isobutyrate | 5% |
| epoxidized soybean oil | 3% |
| tribasic aluminum stearate | 2% |

Small sheets are impregnated with this solution and then the Peet-Grady test is carried out: after the periods of time specified below, 100 houseflies are introduced into the test chamber. After 1 hour the number of dead flies or those lying on their backs is counted. The following results are obtained:

| Time | 1 hour | 2 hours | 5 hours | 12 hours | 15 days | 30 days | 60 days | 90 days | 120 days |
|---|---|---|---|---|---|---|---|---|---|
| % of dead flies | 95 | 100 | 100 | 100 | 100 | 100 | 100 | 95 | 85 |

It is ascertained that there is an excellent immediate action and that this action is in evidence for a period of approximately 100 days.

TABLE I

| Example | 1 | 2 | 3 | 4 | 5 | 6 | 7 | 8 | 9 |
|---|---|---|---|---|---|---|---|---|---|
| DDVP* hydrolized | 27 | 7 | 41 | 5 | 4.2 | 4.5 | 2.1 | 2.2 | 1.7 |

*results given in % of substance hydrolyzed

It has been found that the stabilizers used have the following properties:

considerable effectiveness of epoxy compounds with metal salts;

the degrading action of the alcohol compounds;

the capacity of the stabilizers to reduce the degradation of DDVP.

It has also been found that the following products stabilize DDVP:

n-alkyl epoxystearate;

isoalkyl epoxystearate;

cycloalkyl epoxystearate;

whose branched or unbranched radical contains at least 8 carbon atoms. Their acid component is an unsaturated fatty acid. These substances afford special advantages as they destroy the acids promoting the hydrolysis of DDVP. As a result of their low volatility, they remain active for a long period of time. Their action is also considerably increased because of their relatively high epoxy oxygen content which makes them very effective at a minimum dosage rate.

TABLE II

| Example | 1 | 2 | 3 | 4 | 5 | 6 | 7 | 8 | 9 |
|---|---|---|---|---|---|---|---|---|---|
| Evaporation+ | | | | | | | | | |
| 1st day | 750 | 400 | 500 | 300 | 300 | 250 | 250 | 290 | 280 |
| 2nd day | 750 | 450 | 520 | 330 | 340 | 310 | 300 | 300 | 280 |
| 1st month | 250 | 200 | 200 | 200 | 300 | 280 | 250 | 260 | 240 |
| 2nd month | 100 | 150 | 110 | 165 | 220 | 210 | 180 | 190 | 180 |
| 3rd month | 25 | 90 | 75 | 135 | 160 | 150 | 130 | 130 | 140 |
| 4th month | 10 | 75 | 30 | 110 | 110 | 100 | 100 | 100 | 115 |
| DDVP used++ | 17 | 15 | 25 | 12 | 13 | 10 | 10 | 8 | 6 |
| Duration of action+++ | 60 | 90 | 75 | 120 | 120 | 120 | 135 | 135 | 150 |

+mg/day
++in % of DDVP used
+++in days

As coevaporating substances the products given below may be used (the list should not, however, be taken to be exhaustive):

esters having a molecular weight of from 120 to 150; the esters of formic acid and alcohols having from 7 to 14 carbon atoms and of alcohols having from 6 to 13 carbon atoms; esters of acids having 3 carbon atoms and of alcohols having from 5 to 12 carbon atoms; esters of acids having 4 carbon atoms and of alcohols having 4 to 11 carbon atoms; esters of acids having 5 carbon atoms and of alcohols having from 3 to 10 carbon atoms; esters of acids having 6 carbon atoms and of alcohols having from 2 to 9 carbon atoms; esters of acids having 7 carbon atoms and of alcohols having from 1 to 8 carbon atoms; esters of acids having 8 carbon atoms and of alcohols having from 1 to 7 carbon atoms; esters of acids having 9 carbon atoms and of alcohols having from 1 to 6 carbon atoms; esters of acids having 10 carbon atoms and of alcohols having from 1 to 5 carbon atoms; esters of acids having 11 carbon atoms and of alcohols having from 1 to 4 carbon atoms;

esters of acids having 12 carbon atoms and of alcohols having from 1 to 3 carbon atoms;

esters of acids having 13 carbon atoms and of methyl and/or ethyl alcohol;

esters of acids having 14 carbon atoms and of methyl alcohol; or mixtures of these aliphatic, saturated or unsaturated, aromatic and aromatic branched esters.

Products other than esters but having a molecular weight of less than 1.000, such as:

1,1-diisobutoxyethane
n-ethylethanolamine
nonethanolamine
4-methyl-2-pentyl "Cellosolve"
diethylene glycol diethyl ether
diisopropylethanolamine
undecane
tetrahydrobenzonitrile
n-butylethanolamine
diglycol chlorohydrin
3-ethyl-4-propyltetrahydropropan
n-pentylcyclohexane
1-cyclopentylhexane
dipropylenetriamine
tributylamine
dodecane
isophorone
1-cyclopentylheptane
dihexylamine
tetramethoxyhexane As stabilizers, the following compounds may be used:
a. Non-chlorinated epoxy compounds belonging to the following classes:
alkyloxiranes (e.g. propylene oxide, butylene oxide),
aryloxiranes (e.g. styrene oxide);
epoxycyclanes (e.g. cyclohexane oxide);
esters of epoxy acids (e.g. alkyl epoxy stearate);
glycerides containing an epoxyacyl radical (e.g. oils);
esters of glycidic acid (e.g. ethyl phenylglycidate).

The following may be mentioned as examples of oils: epoxidized poppy oil, epoxidized sunflower oil,, epoxidized linseed oil, epoxidized tung oil.

b. Azo and diazo compounds, e.g. numerous dyes such as aniline yellow and helianthine.

As example of azo compounds having a similar action, the following compounds having the formulae given below may be mentioned (these examples should not be taken to limit the invention):

a)

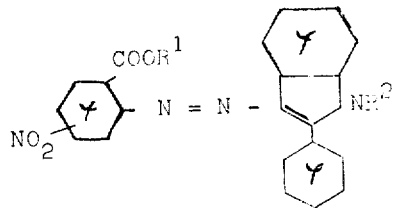

where R¹ denotes a substituted or unsubstituted aliphatic, cycloaliphatic or araliphatic radical and R² denotes hydrogen or a substituted or unsubstituted alkyl radical.

b)

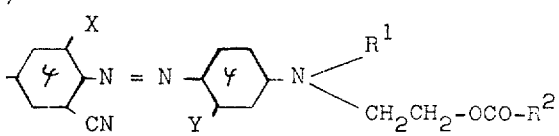

where X denotes hydrogen, chlorine, bromine or a nitro group, Y denotes chlorine or bromine, R¹ denotes a lower alkyl radical, and R² denotes an alkyl radical having from 1 to 4 carbon atoms.

c)

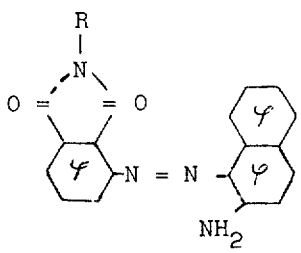

where R denotes a hydroxyalkyl radical.

d) 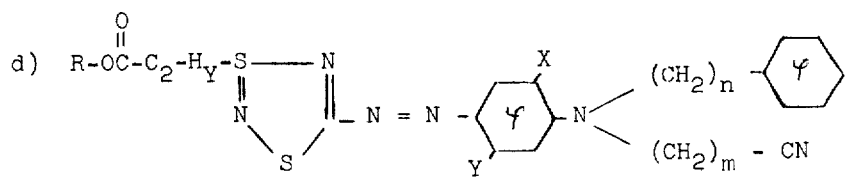

where R denotes a lower alkyl radical, X denotes hydrogen or a methyoxy or ethoxy group, Y denotes hydrogen, chlorine, bromine, a methyl, ethyl, methoxy, ethoxy, acetylamino or propionylamino group, *n* denotes one of the integers 1 and 2, and *m* denotes one of the integers 1 and 2.

e)

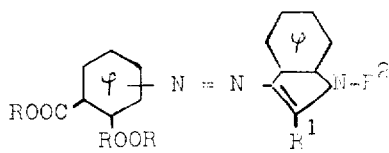

where R denotes identical or different alkyl, cycloalkyl or aralkyl radicals, R¹ denotes a lower alkyl radical or an aryl radical, R² denotes hydrogen or a substituted or unsubstituted alkyl radical.

f)

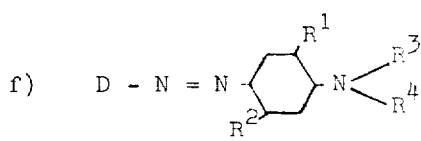

where D denotes a substituted or unsubstituted thiazolyl, thiadiazolyl, benzothiazolyl or benzoisothiazolyl radical, R¹ denotes hydrogen or a methyl, ethyl, methoxyl or ethoxyl group, R² denotes hydrogen, chlorine or a methyl, ethyl, methoxyl, ethoxyl, acetamido or propionamido group, R³ denotes a group having the formula $C_nH_{2n}$—O.CO—$CH_2$—CO—$CH_3$, *n* denoting one of the integers 2, 3 and 4 R⁴ denotes a group having the formula $C_mH_{2m}$—O—CO—$CH_2$—CO—$CH_3$ or $C_mH_{2m}X$, *m* denoting one of the integers 1, 2 and 3 and X denoting a cyano, methoxy or ethoxy group.

These compounds and mixtures of them are used in small amounts of less than 3%, preferably between 0.01 and 1.5%, e.g. between 0.1 and 1%.

It is possible in the Examples to use, as solvent, the active ingredient and certain adjurants; to promote rapid evaporation upon commencement of use, products such as Shell Sol A and Shell Sol KSO may be employed in fairly small amounts of less than 10%. The first of these is an aromatic mixture and the second white spirits. Use may also be made of one or more of the following substances: o-xylene, 1-nonene, nonane, isopropylbenzene, n-propylbenzene, m-ethyltoluene, p-ethyltoluene, dicyclononadiene, o-ethyltoluene, 1,3,5-trimethylbenzene. It is not possible to use them as coevaporating substances as they are too volatile and do not control the release of the active ingredient. It has been found that these solvents entrain only about 10% of DDVP when evaporating and retard the evaporation of useful quantities of active ingredient.

c. metal stearates, such as monobasic, dibasic and tribasic aluminum stearates, monobasic and dibasic magnesium stearates, and monobasic and dibasic calcium stearates.

It has been found that:
a. the coevaporating substances regulate the release;
b. the duration of action is increased as a result of the regulation of the release;
c. almost all the active ingredient evaporates;
d. it is necessary to use coevaporating substances and stabilizers.

EXAMPLE 10

Employing a solution similar to Example 4, but in which the amount of epoxy compound rises, at the expence of the coevaporating substances, from 5 to 10%, it has been found that the amount of hydrolized DDVP increases considerably. It is therefore essential to calculate carefully the amount of epoxy compound in order to suppress hydrolysis; any excess leads to an increase in hydrolysis. The amount should therefore be calculated to combat the degree of acidity of the solution and that formed by the possible hydrolysis of DDVP, and to suppress the action of the hydroxyl compounds of the esters used as coevaporating substances.

EXAMPLE 11

A sheet of lignocellulose (20 × 11 × 0.5 cm) is impregnated with solution A; a second identical sheet is dried to constant weight at 120°C in a drying cabinet and then sprayed with octadecyltrichlorosilane. After drying, the sheet is impregnated in the same way as the first sheet. The two sheets are kept under the same conditions at 20°C ± 2°C in a room with a volume of 40 m³, the air being replenished several times a day. The course of the evaporation of the DDVP from the plates is observed and the following results noted which are comparable with those in Example 9.

| Results | Example 9 | Treated plate |
|---|---|---|
| DDVP in % hyrolyzed | 1.7 | 0.9 |
| Evaporation in mg/72 hours — Evaporation at beginning of 1st month | 240 | 240 |
| 2nd " | 180 | 180 |
| 3rd " | 140 | 145 |
| 4th " | 115 | 120 |
| Residual DDVP in % | 6 | 4 |
| Duration of action in days | 150 | 165 |

It is found that when used on the treated plate DDVP evaporates less rapidly, is effective longer and there is a substantial reduction in the amount of DDVP hydrolyzed.

EXAMPLE 12

The composition A (in an amount of 20%) is suitably kneaded with a mixture of polyvinyl chloride, diisooctyl adipate and heavy plasticizers so that there is 19% of DDVP in the whole, i.e. about the same amount as in the commercially available plates.

After the plates have been used for 100 days it is found that 4 g of DDVP remains in the plates as prepared above as compared with the 7 g in the commercial plates. It was noticed in the course of the experiment that the DDVP was discharged more evenly, especially during the first month.

Dichlorovos is a very suitable insecticide in the agricultural field because it decomposes completely, unlike other chlorinated products which do not decompose. Consequently it does not affect the ecology or environment. However it decomposes too quickly to be able to have total action on certain agricultural parasites. Certain adjuvants were tested to extend the period of effectiveness of DDVP on its own. The stabilizers according to the present invention prolong the effectiveness. When they are mixed with the abovementioned additives the composition according to the present invention constitutes a further advance in the art. It has been found that when the composition is added to polyesters which are preferably unsaturated and not compatible with DDVP, and to dextrins, alginates (derived from algae), polysaccharide gums, the duration of action was considerably increased in the laboratory, namely up to 10 times the duration of DDVP on its own. A small fraction of the increased duration of action can be ascribed to the reduced availability of DDVP, but the special adjuvants which have to be used with the stabilizing additives cause the insecticide to remain active much longer.

For disinfecting loci it is general practice to fumigate the atomized insecticide using a volatile product such as methylene chloride. It has been found that excellent results are obtained with the compositions according to the invention based on DDVP. The effectiveness of this treatment can in fact last as long as 3 or 4 days whereas DDVP on its own is effective only for 1 day and sometimes even shorter under the same conditions. Moreover if the abovementioned compositions are mixed with the specific adjuvants mentioned above in an amount of 0.5 to 2% the effectiveness may last about 10 days. DDVP is ideal for this purpose for it leaves no traces, decomposing quickly and completely on contact with moisture. In this respect it is superior to other insecticides, especially the chlorinated hydrocarbons.

For the parasiticidal control of helminths the compositions according to the invention may be used on a plastic carrier which is not compatible with DDVP, i.e. for which it does not act as a plasticizer, e.g. on a saturated or unsaturated polyester or on silicones.

On no condition may the material be PVC, for which DDVP is a plasticizer. Sheets of the selected material are impregnated and then granulated. Impregnated spheres may also be used. It has been found that to control internal helminths the compositions may be added to the animal's food. Various methods achieving the same results may be used. However if the animals are to swallow the compositions, the latter should be in solid rather than liquid form. Accordingly, the granules may be incorporated into gelatine spheres, capsules or dragées which decompose in a specific part of the animal's digestive tract, for example in the intestine. Examples of substances which meet this requirement are gelatine, methyl cellulose and alginates like calcium alginate A. A sweetened syrup may also be used which is added to drinking water. In this case the syrup and the stabilized compositions are prepared independently and mixed with one another at the moment they are required; stabilized DDVP can be used in the presence of water.

The DDVP concentration in these compositions is between 10 and 75%, preferably between 20 and 35%. It is essential that these compositions should contain the stabilizers specified herein. The amount of composition administered to the animal should be such that the amount of DDVP absorbed is between 10 and 25 mg per kilogram of the animal's weight.

One of the many advantages of this is that it is not necessary to continue the treatment, in other words there is no inurement, and another advantage is that the composition can be added to the last portion of food or drinking water. Generally one dose is sufficient for this treatment, since the first worms are excreted within 13 hours of the treatment. This method of treatment is substantially more effective and less expensive than certain known methods, particularly that using piperazine, and furthermore it has the advantage that it is effective on worms smaller than and different from those controlled by this product.

Furthermore, due to its ready decomposition in warm bloods, DDVP has the big advantage when used on animals destined for human consumption that no traces of the substance remain in the meat, nor does it accumulate, which is extremely important for the breeder and consumer. No trace of DDVP was found by vapor chromatography in the meat of an animal which had been treated with the compositions according to the invention.

EXAMPLE 13

DDVP is administered in the following forms in food to pigs suffering from internal parasites of the helminth family; different pigs are used for each experiment:
Lignocellulose impregnated with DDVP alone;
Lignocellulose impregnated with solution A;
Unsaturated polyester granules impregnated with solution A.

The same granules as above incorporated into capsules — various types of gelatine spheres — which dissolve in the intestine. Stabilized solution A in drinking water with crosslinking compounds so that two liquid phases are not formed.

In all cases the amount of DDVP absorbed is 18 mg per kilogram.

The best results are obtained where the pigs had eaten capsules. 10 hours after the treatment very large numbers of worms were found in the excrement. Then came the results with the pigs which had eaten the impregnated granules without the gelatine spheres, then those with the pigs which had eaten the lignocellulose impregnated with solution A, and finally those with the group which had drunk the drinking water mixed with solution A. A long way behind these results came those which had been achieved using the lignocellulose impregnated solely with DDVP.

This experiment shows that it is preferable to use carriers for the DDVP and/or the stabilized solution which are not affected by the animal's digestion, especially the gastric juices.

It has been found that the polyesters enhance the action of DDVP and the compositions according to the invention; the polyesters should preferably be unsaturated.

The polyesters are generally prepared by reacting a diol with a diacid. If the diol and diacid are selected carefully the polyesters may be prepared at room temperature and mixed with plasticizers, an active ingredient, i.e. DDVP in this case, and compounds which can be polymerized onto them. These compositions may be cured by conventional processes, but if this is to be done at room temperature it is advantageous to use diacyl peroxides such as benzoyl peroxide, dialkylamines such as dimethylaniline, ketoperoxides such as dimethylketoperoxide, and specific cobalt or vanadium accelerators which retain their activity even in the presence of DDVP. These compounds may be present in various forms: sheets, spheres or tablets, which have the advantage that they are dry and do not exude moisture; they are used exclusively for controlling internal helminths.

EXAMPLE 14

A polyester is prepared from maleic anhydride, phthalic anhydride and then dissolved in styrene. 40% by weight of DDVP stabilized with an azo compound, 5% of methylethylketoperoxide dissolved in 40% methyl phthalate, and 1.5% of cobalt acetyl acetonate dissolved in dioctyl phthalate are added to the above mixture. A material is prepared from the whole and granulated very fine. The substance is dry and exudes no moisture.

These granules are incorporated into gelatine spheres which dissolve in the pig's intestine in such a way that the amount of DDVP administered to the animal is between 15 and 25 mg per kilogram of its weight. It is observed that with this treatment a greater number of worms is present in the excrement than is the case with the other types of treatment, and that certain types of worms are controlled which are not controlled by the other methods.

EXAMPLE 15

Composition 9, in which the epoxy compound is replaced by a non-toxic azo compound (tartrazine), is mixed with Palatol 320L so that a material is formed which can be granulated (Palatol 320L is a BASF commercial polyester).

It is not possible to use toxic substances for the anthelmintic compounds. We have found that the application of tartrazine in amounts of 0.2% with reference to the DDVP provides a very satisfactory stabilization. Tartrazine is the trisodium salt of (sulfo-4'-phenylazo-1')-4-(sulfo-4'-phenyl)-1-hydroxy-5-pyrazolecarboxylic acid-3.

Amounts of between 0.05 and 0.5% of the following nontoxic compounds were also used:
disodium salt of p-sulfobenzeneazoresorcinol or dihydroxy-2-4-azo-benzenesulfonic acid
disodium salt of (sulfo-4'-phenylazo-1')-1-amino-4-benzenesulfonic acid
disodium salt of (sulfo-4'-phenylazo-1')-1-naphthol-2-sulfonic acid-6
disodium salt of (sulfo-3'-phenylazo-1')-1-naphthol-2-sulfonic acid-6
sodium salt of (sulfo-4'-naphthylazo-1')-2-naphthol-1-sulfonic acid-4
trisodium salt of (sulfo-4-naphthylazo-1')-naphthol-2-disulfonic acid
tetrasodium salt of (sulfo-4-naphthylazo-1')-naphthol-2-trisulfonic acid-3-6-8
tetrasodium salt of (sulfo-4-phenylazo-1')-4-sulfo-7'-naphthylazo-1'-hydroxyacetylamino-8-naphthalenedisulfonic acid-3,5
tetrasodium salt of 4-(sulfo-1-phenylazo-7')-sulfo-1-naphthylazo-1-hydroxy-7-aminoaphthalene-3,6-disulfonic acid.

Domestic animals, sheep, cattle and pigs which are suffering from internal parasitic worms are treated with small particles incorporated in a gelatine sphere or in delayed action dragées, in amounts of 20 mg of DDVP per kilogram of the animal's weight. The results are rapid: worms are visible 13 hours after ingestion. This means that the active ingredient is very effective because only one day of treatment is necessary, which prevents inurement in the host. This form of treatment has the advantage that it is effective and less expensive than certain other ones.

Similarly, instead of polyesters, silicones may be used which give analogous results. An experiment with Silastic 382 Elastomer (a commercial silicone of Dow Corning) in the form of fine tubes showed that vapors, but not the liquid, escaped through the walls of the tubes.

Similar results are obtained with a stabilized DDVP solution in the interior of a hollow gelatine sphere which does not dissolve until it reaches that part of the digestive tract where the helminths are.

These stabilizers have the advantage over polyvinyl chloride that they do not require a plasticizer or only substantially smaller amounts. Either these plasticizers cannot be assimilated by the animals or they are poisonous.

The granules based on polyesters may be prepared as follows. A polyester resin is prepared by the polycondensation of bis(carboxylpentylamino)-2,5-parabenzoquinone with polyethylene glycol which esterifies at 160°C without gel formation. This resin is mixed with DDVP which is stabilized in the composition according to the invention with inert substances, e.g. silica gel which is incompatible with DDVP, i.e. is insoluble and cannot be plasticized. The synthetic resin prepared in this way increases the duration of action and the remanence of the dichlorovos.

A rubber based on polydimethylsiloxane and containing some organoelementary siloxane trace elements can similarly be used. Examples of silicones are tris-(polydimethylsiloxy)aluminoxane and tris-(polydimethylsiloxy)-hydroxy-8-quinoline titoxinate; these products are excreted after their vermicidal action. Expandable thermoplasts which are incompatible with DDVP, expandable polyolefins, cheap plastics, which are available in large quantities, and protein fibers may also be used. A very special substance for this purpose is polyglycolic acid which is extremely strong and very easy to handle. Polysilazanes containing disilazane cyclene have greater stability than polysiloxanes, especially in respect of their stability in water and alkalis. Ion-exchange resins are particularly useful for conveying the dichlorovos to the digestive tract, one of them (made from cellulose) even being capable of being digested by animals.

If stabilized DDVP is used in drinking water, other substances may be added which are effective but less toxic, such as thiobenzadol, tetramizole and benomyl, as well as pyrimidines and even compounds like 3-sulfanylamidoisoazole and/or a salt of an active derivative of pyrimidine.

I claim:

1. An insecticidal composition useful against houseflies, said composition consisting of

| | |
|---|---|
| dimethyl dichlorovinyl phosphate | 45% |
| isobutyl benzoate | 20% |
| dibutyl maleate | 10% |
| ethyl maleate | 10% |
| dibutyl fumarate | 5% |
| isoamyl isobutyrate | 5% |
| epoxidized soybean oil | 3% |
| tribasic aluminum stearate | 2%. |

* * * * *